United States Patent Office 2,706,669
Patented Apr. 19, 1955

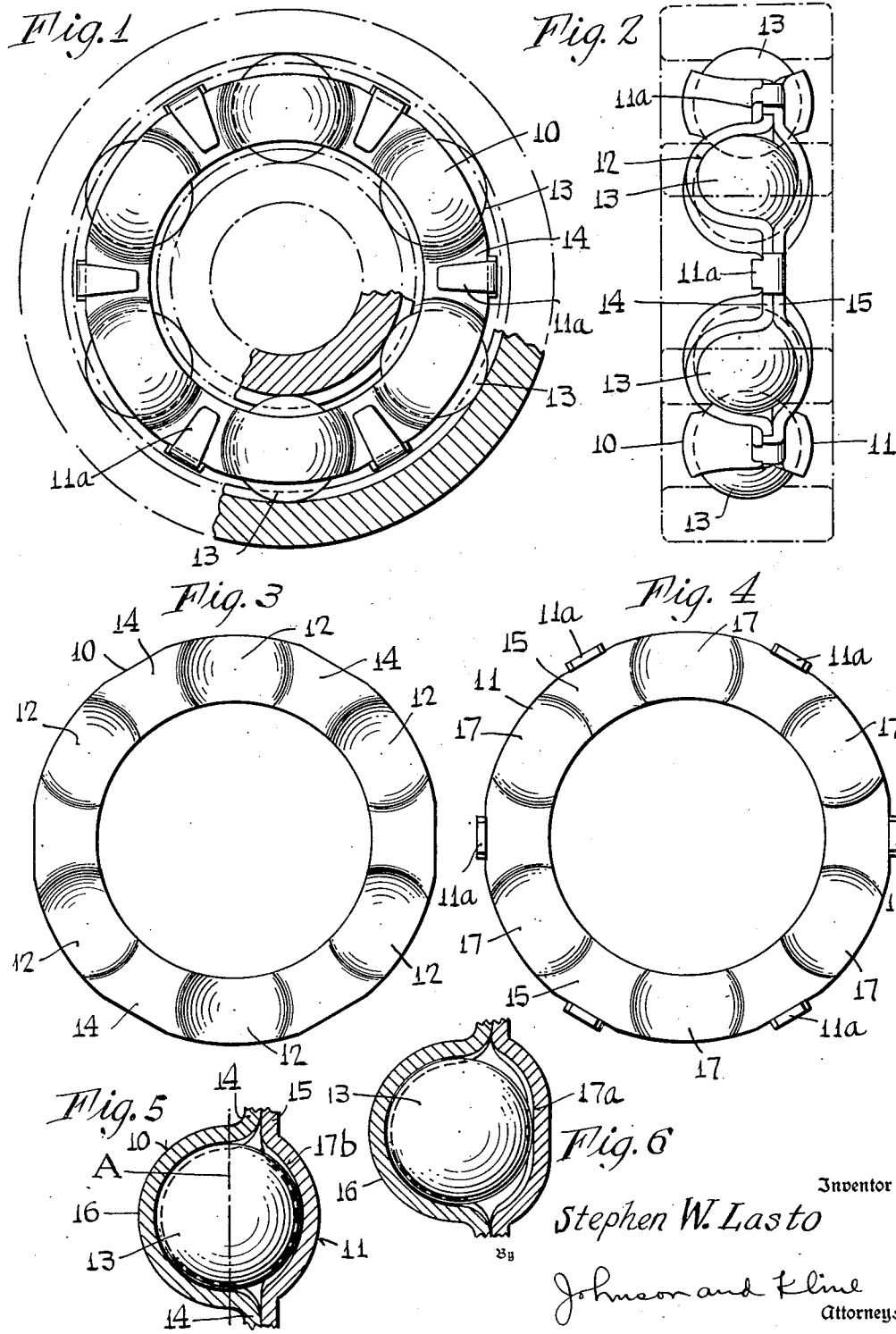

2,706,669

BALL BEARING RETAINERS

Stephen W. Lasto, Shelton, Conn.

Application October 20, 1952, Serial No. 315,682

3 Claims. (Cl. 308—201)

This invention relates to ball bearings, and more particularly to improvements in ball retainers.

Heretofore, it has been the custom to form ball retainers of two stampings, each comprising partially hemispherical portions to encircle the balls and intermediate flat portions on both stampings secured together.

Theoretically, the partially hemispherical portions, pitch diameter and depth of pocket of both stampings might be made identical so that the ball contained will freely rotate in the socket formed in the two parts. However, in actual quantity production of retainers, it is impossible to produce the partially hemispherical portion, pitch diameter and depth of pocket with such perfection and uniformity as to make retainers picked at random usable in precision and delicate instruments which would fail if there were the slightest binding of the balls in the retainer. As a consequence, it has been necessary to make and inspect a large number of mass produced retainers and select those which more or less by the law of chance are sufficiently perfect for the intended use.

I have found that one of the difficulties has been that in drawing the partially hemispherical portions of the retainer parts there is variable and uncontrollable spring back, and even though this might be slight, if it should happen that there is appreciable spring back or other malformation of the two partially hemispherical portions, pitch diameter and depth of pocket which by chance oppose each other when the parts are assembled, the difficulty is aggravated and error doubled when two halves oppose each other and the socket may be sufficiently out of alignment to cause the ball therein to jam; also the working clearance between the ball and pocket has been lost, and causing the bearing to hang up and bind and not rotate freely.

To obviate these difficulties, the retainer of the present invention is so made as to require only one of the two parts making up the retainer to be deep drawn while the other part merely serves to hold the ball in the socket of the other part.

In the form of the invention herein illustrated as exemplary thereof, one of the parts of the retainer is provided with more or less flat ball engaging portions making point contact with the ball while the other part has partially hemispherical portions reaching on two sides of the equator of the ball and then curving outwardly and toward the other part and then flat to lie against and be secured to the companion portion of the other part. As a result of this conforming engagement of the ball on one half only, the danger of jamming is substantially eliminated even though there be present the unavoidable and usual variations in the formation of the partially hemispherical portion in the retainer. Since only one-half of the retainer controls, the ball variations are not duplicated in the assembly of the bearing as heretofore inasmuch as the other part not being deep drawn may be made extremely accurate by mass production methods Another advantage of the present invention is the elimination of the necessity for extreme accuracy in the radial location of the pocket in the retainer inasmuch as the one pocket controls the location of the ball and the other half can be off substantially without causing the jamming of the balls.

Thus it will be seen that by the present invention disadvantages arising from the accumulation of error which, by the prior methods, take up the clearance or rendered the balls too loose in the retainer, depending upon the direction of error, have been eliminated.

Other features and advantages will hereinafter appear.

In the accompanying drawings—

Figure 1 is a face elevation of a ball-containing retainer made in accordance with the present invention.

Fig. 2 is an edge view of the same.

Fig. 3 is an elevation of one of the rings of the retainer.

Fig. 4 is a similar view of the other ring of the retainer.

Fig. 5 is a sectional view of one form of ball-containing socket of the present invention.

Fig. 6 is a sectional view of another form of the ball-containing socket of the present invention.

As shown in the accompanying drawings, the ball retainer of the present invention comprises two complementary rings 10 and 11 formed of sheet metal stampings and constituting between them sockets 12 for the balls 13 and flat abutting portions 14 and 15 respectively spacing the balls the desired distance apart. After the balls are placed on the sockets, the rings are brought together with the spacing portions 14 and 15 solidly engaging each other, and then secured together. While the rings may be riveted or otherwise fastened, in the illustrated form of the invention lugs 11a formed on the ring 11 are bent over the portions 14 on the ring 10 to secure the rings together for movement as one.

Heretofore, the rings were usually substantial duplicates of each other, each ring having partially hemispherical portions together constituting a ball socket having spherical surfaces conforming to spherical surfaces of the ball, and embracing the ball sufficiently laterally retaining it in position. The making of the partially hemispherical portions in the sheet metal ring required deep forming, amounting to a drawing operation, involving both metal stretching and flowing. The recovery or spring back of the metal for each socket half depended upon the grain and hardness of the metal at that particular place, and hence variations occurred in the pitch diameter, depth and shapes of the several socket halves in each ring. If when the duplicate rings are placed together the variations of the socket halves which happen to face each other are toward the ball the error will be cumulative and will tend to take up the clearance usually provided so that the ball may have a tendency to stick. If the variations are away from the ball the ball may be too loosely held and have a tendency to jam. Also when variations occur in the radial location and spacing of the sockets around the retainer, these may cause misalignment of the socket halves when the retainers are put together resulting in jamming of the ball. Only by chance would all of the pairs of facing socket halves be perfectly formed or have their variations cancel out each other.

In addition to this problem, there is the further difficulty in manufacturing identical rings to form a ball retainer in connection with the making and maintenance of the tools to form the rings. In all work of this kind, some tolerance must be permitted for practical reasons. Hence, it is virtually impossible to have the punch and die portions which form the socket halves exactly spaced and exactly made so that when two rings picked at random from a mass are placed together all of the sockets will have perfectly spherical surfaces without variations. Even if the tools are so perfectly made initially, in use the wear is not always uniform and imperfections or variations of different extent occur in the respective socket halves. If two sets of punch and die units are used, one to make each of the rings, the problem is further aggravated by the necessity of having the socket half-forming portions of both sets of punches and dies identical.

The variations or non-uniformity of the like socket halves above referred to renders the retainers unsuitable for use in scientific or other instruments where extreme accuracy and free movement under weak forces is necessary. Hence, in producing ball bearing retainers for such purposes, it has been necessary heretofore to make the retainers with as much precision as possible, assemble them with the balls, and then select from a large number of such ball-containing retainers those which are sufficiently free turning and accurate for the special use, the remainder being sold at reduced cost for less critical work.

The difficulties above referred to have been obviated by the present invention by forming a retainer of two different rings, one having partially hemispherical ball-receiving sockets which control the balls and the other having more or less flat and shallow sockets making point-contact with the balls and retaining the ball in the ball-receiving socket. The relatively flat half socket being shallow is easily formed with great accuracy since it is not deep drawn, and while variations may occur in the deep drawn ball-receiving half socket, these variations are not augmented by variations in the other half socket. Moreover, while variations in the spacing of the ball-receiving sockets may occur, they will result merely in causing the ball to engage a different part of the flat socket and thus avoid binding from this cause.

As shown in the accompanying drawings, the ring 10 is formed so as to have partially hemispherical portions 16 curved to partially embrace the ball in one direction and curved in the other direction to embrace the ball at least as far as the equator A, and then curve downwardly and outwardly so that the flat portions 14 are substantially offset from the centers of the row of balls. The ring 11 shown in Fig. 4 has a shallow drawn socket part 17 which curves at each end toward the flat portion 15. The socket part 17 is curved slightly to embrace the ball in one direction and in the other direction may be substantially straight as at 17a, Fig. 6, or it may be curved as at 17b, Fig. 5, in which the curve is on a greater radius than that of the ball. In either case, when the two rings 10 and 11 are assembled with the balls, the ball is controlled by the portion 16 and makes only point-contact with the socket part 17 and hence the possibility of the ball jamming or sticking is substantially avoided.

Since the ball 13 is embraced for only half of its circumference by the ball-receiving socket, the tendency to jam or stick is obviated, notwithstanding the presence of unavoidable variations in the ball-receiving socket, because the point-contact at the opposite side of the ball against the socket portion 17 permits the ball to center itself in the socket 16.

Variations and modifications may be made within the scope of the claims and portions of the improvements may be used without others.

I claim:

1. A retainer for a ball-bearing unit adapted to have a plurality of spaced balls therein comprising a pair of stamped sheet metal companion retainer rings each having ball socket portions and spacing portions between the latter, the ball-receiving socket portions of one ring each being partially hemispherical to contact a ball at least from one side to the other of the ball's equator and the socket portions of the other ring each having a contact portion making solely point-contact with the opposite side of the ball, said point-contact surface portions and said partially hemispherical portions curving away from the balls to join the spacing portions, and means for securing the spacing portions together in juxtaposition to confine the balls between said rings, said point-contact surface portions being shallow drawn and the juxtaposed spacing portions of the rings being in a line lying between the point-contact portions and a line through the centers of the balls in said sockets.

2. The invention as defined in claim 1 in which the surface of each point-contact portion has a substantially straight portion against which the ball is engaged.

3. The invention as defined in claim 1 in which the surface of each contact portion is on an arc of greater radius than that of the ball.

References Cited in the file of this patent

UNITED STATES PATENTS

| | | |
|---|---|---|
| 1,176,133 | Czech | Mar. 21, 1916 |
| 1,365,426 | Spanitz | Jan. 11, 1921 |
| 1,507,586 | Cooper | Sept. 9, 1924 |
| 1,825,365 | Runge | Sept. 29, 1931 |
| 1,982,450 | Parsons | Nov. 27, 1934 |

FOREIGN PATENTS

| | | |
|---|---|---|
| 49,406 | Sweden | Aug. 15, 1918 |